(12) United States Patent  
Unser et al.

(10) Patent No.: US 9,390,430 B2  
(45) Date of Patent: Jul. 12, 2016

(54) METHOD AND SYSTEM FOR SALES STRATEGY OPTIMIZATION

(71) Applicant: MASTERCARD INTERNATIONAL INCORPORATED, Purchase, NY (US)

(72) Inventors: Kenny Unser, Fairfield, CT (US); Jean Pierre Gerard, Croton-on-Hudson, NY (US); Kent Olof Niklas Berntsson, Rye, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 5 days.

(21) Appl. No.: 14/329,085

(22) Filed: Jul. 11, 2014

(65) Prior Publication Data

US 2016/0012457 A1    Jan. 14, 2016

(51) Int. Cl.
```
G06Q 10/00       (2012.01)
G06Q 30/02       (2012.01)
G06Q 10/06       (2012.01)
```

(52) U.S. Cl.
CPC .......... *G06Q 30/0202* (2013.01); *G06Q 10/063* (2013.01)

(58) Field of Classification Search
CPC ...................................................... G06Q 10/063
USPC ............................................ 705/14; 235/380
See application file for complete search history.

(56) References Cited

U.S. PATENT DOCUMENTS

| | | | | |
|---|---|---|---|---|
| 8,326,705 B2* | 12/2012 | Niessen | ................. | G06Q 10/02 705/14.1 |
| 2005/0071223 A1* | 3/2005 | Jain | ........................ | G06Q 30/02 705/14.13 |
| 2013/0262227 A1* | 10/2013 | Lin | .................... | G06Q 30/0224 705/14.53 |

FOREIGN PATENT DOCUMENTS

JP      2002163724 A  *  6/2002

* cited by examiner

*Primary Examiner* — Christle I Marshall  
(74) *Attorney, Agent, or Firm* — Ohlandt, Greeley, Ruggiero & Perle, L.L.P.

(57) ABSTRACT

A method for identifying a payment card holder preference for a certain sales technique. The method involves retrieving, from one or more databases, a first set of information including purchasing and payment activity information attributable to one or more payment card holders; retrieving, from one or more databases, a second set of information including merchant information associated with the purchasing and payment activity; retrieving, from one or more databases, a third set of information including sales technique information; analyzing the first set of information and the second set of information to generate one or more predictive payment card holder profiles; and correlating the one or more predictive payment card holder profiles with the sales technique information to identify payment card holder preference for the certain sales technique. A system for identifying payment card holder preference for a certain sales technique is also provided.

23 Claims, 9 Drawing Sheets

| AUTOMOTIVE FUEL (AFS) | GROCERY STORES (GRO) | EATING PLACES (EAP) | ACCOMODATIONS (ACC) |
|---|---|---|---|
| SHELL | KROGER | MCDONALD'S | HOLIDAY INN |
| EXXONMOBIL | PUBLIX SUPER MARKETS | SUBWAY | HAMPTON INN HOTELS |
| BRITISH PETROLEUM / BP | TRADER JOE'S MARKET | WENDY'S | BEST WESTERN / BEST WESTERN HOTELS |
| CHEVRON | WHOLE FOODS MARKET | BURGER KING | MARRIOTT |
| SUNOCO | SAFEWAY | TACO BELL | HILTON |
| CITGO | STOP & SHOP | STARBUCKS | DAYS INN |
| MARATHON | H-E-B GROCERY / H-E-B | KENTUCKY FRIED CHICKEN | DISNEY RESORTS |
| 7-ELEVEN | FOOD LION | PIZZA HUT | HOLIDAY INN EXPRESS |
| VALERO | SHOP-RITE | DUNKIN DONUTS | COMFORT INN |
| CONOCO | KANGAROO | CHICK-FIL-A | COURTYARD BY MARRIOTT |
| SPEEDWAY | GIANT EAGLE | PANERA BREAD / ST LOUIS BREAD COMPANY | SUPER 8 MOTELS |
| MURPHY USA | GENERAL NUTRITION CENTER / GNC | APPLEBEE'S | SHERATON / SHERATON HOTELS |
| PILOT TRAVEL CENTERS | WEGMANS | ARBY'S | DOUBLETREE |
| HESS EXPRESS | SAVE A LOT | DAIRY QUEEN | LA QUINTA INNS |
| GULF OIL | WINN-DIXIE | SONIC AMERICA'S DRIVE IN | QUALITY INN |

*FIG. 4*

METHOD AND SYSTEM FOR SALES STRATEGY OPTIMIZATION

BACKGROUND OF THE DISCLOSURE

1. Field of the Disclosure

The present disclosure relates to a method and a system for sales strategy optimization based on spend behavior. In particular, the present disclosure relates to a method and a system for identifying payment card holder preference for certain sales techniques through the generation of predictive payment card holder profiles that are based upon purchasing and payment activity information attributable to the payment card holders and merchant information, and the correlation of the predictive payment card holder profiles with sales technique information to identify payment card holder preferences for certain sales techniques.

2. Description of the Related Art

A variety of difficulties, inconveniences, and/or inefficiencies may be encountered in conjunction with transactions involving goods and services between merchants and customers. For example, it can be cumbersome and time consuming for the customer to arrive at a section of the store (e.g., the lumber aisle, the flooring aisle, the plumbing aisle) where the items the customer desires (e.g., plywood, ceramic flooring, bathroom plumbing fixtures) are located, and to find a sales person to help with questions, and to interact with the sales person to complete a purchase of the desired items. From the perspective of the merchant, it may be desirable to make the task of shopping more efficient, convenient, and satisfying for the customer. It may also be desirable to increase sales by improving interaction with sales persons, by using appropriate sales techniques, by presenting customers with an increased number of choices in specific areas, and otherwise by reducing the impact and/or occurrence of undesirable events.

Although it is a goal of most or all merchants to improve the customer's shopping experience, several aspects of the traditional shopping process may detract from this goal. For example, once a customer has arrived at the merchant's facility, the customer may be put off by the sales tactics used by the sales person. Other inefficiencies in dealing with the sales person may also detract from this goal.

As an example, a customer is in an electronics superstore and is looking at TVs. A sales person approaches and immediately begins a high pressure sales pitch with the obvious intent to complete a sale as quickly as possible. However, the customer can be totally put off by this high pressure type of sales approach. Because of the sales approach, the customer may decide not to complete a purchase for a TV, or may even decide to leave the store immediately to get away from the aggressive sales person. This leads to an unproductive shopping experience, a waste of the customer's time, lowered customer loyalty, and from the merchant's point of view is a waste of the value that an expert sales person brings to the brick and mortar shopping experience versus buying something online.

Different people have different buying motivations and they need to be approached in different ways. It is desirable that sales techniques be optimized based on customer preferences. For example, some customers respond to sales approaches stressing savings or value while others are more interested in emerging technologies, status displays, or quality of goods.

A system and/or method for facilitating a transaction, e.g., shopping experience, between a merchant and a customer, by employing sales techniques consistent with customer preferences, would be very advantageous to the customer. It could also offer advantages to merchants by allowing store management to be able to apply specific sales techniques to specific customers, leading to a more desirable shopping experience for customers and greater customer loyalty.

A need exists for a system that can identify sales techniques that are consistent with customer preferences. A more holistic view of a consumer's personal circumstances, including merchant sales technique preferences, is needed for a more desirable shopping experience for customers. Further, a need exists for a system that can analyze a customer's personal circumstances and preferences, and identify customer activities and circumstances that can represent an opportunity for a merchant to provide a more desirable shopping experience for customers.

SUMMARY OF THE DISCLOSURE

The present disclosure relates to a method and/or a system for sales strategy optimization based on spend behavior. In particular, the present disclosure relates to a method and/or a system for identifying payment card holder preference for certain sales techniques through the generation of predictive payment card holder profiles that are based upon purchasing and payment activity information attributable to the payment card holders and merchant information, and the correlation of the predictive payment card holder profiles with sales technique information to identify payment card holder preferences for certain sales techniques.

The present disclosure also relates to a method and system for enabling an entity to employ a sales technique consistent with a payment card holder preference, specifically for the entity associating or otherwise partnering with a financial transaction processing entity to identify payment card holder preferences for certain sales techniques through the generation of predictive payment card holder profiles that are based upon purchasing and payment activity information attributable to the payment card holders and merchant information, and correlation of the predictive payment card holder profiles with sales technique information to identify payment card holder preferences for certain sales techniques.

The present disclosure provides a method for identifying payment card holder preference for a certain sales technique. The method includes: retrieving, from one or more databases, a first set of information including purchasing and payment activity information attributable to one or more payment card holders; retrieving, from one or more databases, a second set of information including merchant information associated with the purchasing and payment activity; retrieving, from one or more databases, a third set of information including sales technique information; analyzing the first set of information and the second set of information to generate one or more predictive payment card holder profiles; and correlating the one or more predictive payment card holder profiles with the sales technique information to identify payment card holder preference for a certain sales technique.

The present disclosure also provides a system for identifying payment card holder preference for a certain sales technique. The system includes: one or more databases comprising a first set of information including purchasing and payment activity information attributable to one or more payment card holders; one or more databases comprising a second set of information including merchant information associated with the purchasing and payment activity; and one or more databases comprising a third set of information including sales technique information. A processor configured to: analyze the first set of information and the second set of information to generate one or more predictive payment card holder profiles; and correlate the one or more predictive payment card holder profiles with the sales technique information to identify payment card holder preference for a certain sales technique.

The present disclosure further provides a method for generating one or more predictive payment card holder profiles. The method involves retrieving, from one or more databases, a first set of information including purchasing and payment activity information attributable to one or more payment card holders; retrieving, from one or more databases, a second set of information including merchant information associated with the purchasing and payment activity; retrieving, from one or more databases, a third set of information including sales technique information; analyzing the first set of information, the second set of information and the third set of information to determine behavioral information of the payment card holders; extracting information related to an intent of the payment card holders from the behavioral information; and generating one or more predictive payment card holder profiles based on the behavioral information and intent of the payment card holders. The payment card holders have a propensity to prefer a certain sales technique based on the one or more predictive payment card holder profiles.

The methods and systems of this disclosure afford several advantages. For example, the methods and systems identify merchant sales techniques that are consistent with customer preferences. A more holistic view of a consumer's personal circumstances, including merchant sales technique preferences, is provided for a more desirable shopping experience for customers. Further, the system of this disclosure can analyze a customer's personal circumstances and preferences, and identify customer activities and circumstances that can represent an opportunity for a merchant to provide a more desirable shopping experience for customers.

These and other systems, methods, objects, features, and advantages of the present disclosure will be apparent to those skilled in the art from the following detailed description of the embodiments and the drawings.

BRIEF DESCRIPTION OF THE DRAWINGS

FIG. 4 shows illustrative merchants in selected industry categories in accordance with exemplary embodiments of the present disclosure.

A component or a feature that is common to more than one figure is indicated with the same reference number in each figure.

DESCRIPTION OF THE EXEMPLARY EMBODIMENTS

Figure 1:
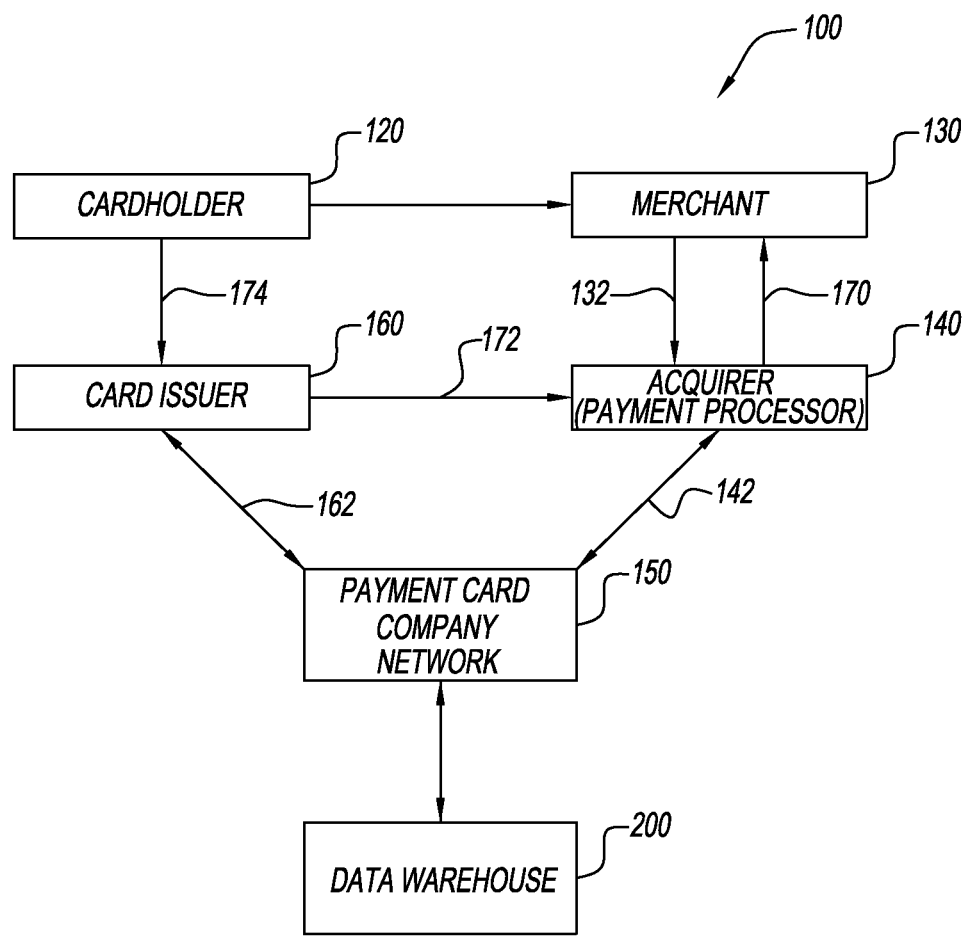
FIG. 1 is a block diagram illustrating a high-level view of system architecture of a financial transaction processing system for use in accordance with exemplary embodiments of the present disclosure.

Embodiments of the present disclosure can now be described more fully hereinafter with reference to the accompanying drawings, in which some, but not all, embodiments of the disclosure are shown. Indeed, the present disclosure can be embodied in many different forms and should not be construed as limited to the embodiments set forth herein. Rather, these embodiments are provided so that this disclosure can satisfy applicable legal requirements. Like numbers refer to like elements throughout.

As used herein, entities can include one or more persons, organizations, businesses, institutions and/or other entities, including but not limited to, financial institutions, and services providers, that implement one or more portions of one or more of the embodiments described and/or contemplated herein. In particular, entities can include a person, business, school, club, fraternity or sorority, an organization having members in a particular trade or profession, sales representative for particular products, charity, not-for-profit organization, labor union, local government, government agency, or political party.

As used herein, the one or more databases configured to store the first set of information or from which the first set of information is retrieved, the one or more databases configured to store the second set of information or from which the second set of information is retrieved, and the one or more databases configured to store the third set of information or from which the third set of information is retrieved, can be the same or different databases.

The steps and/or actions of a method described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some embodiments, the processor and the storage medium can reside in an Application Specific Integrated Circuit (ASIC). In the alternative, the processor and the storage medium can reside as discrete components in a computing device. Additionally, in some embodiments, the events and/or actions of a method can reside as one or any combination or set of codes and/or instructions on a machine-readable medium and/or computer-readable medium, which can be incorporated into a computer program product.

In one or more embodiments, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Computer program code for carrying out operations of embodiments of the present disclosure can be written in an object oriented, scripted or unscripted programming language such as Java, Perl, Smalltalk, C++, or the like. However, the computer program code for carrying out operations of embodiments of the present disclosure can also be written in conventional procedural programming languages, such as the "C" programming language or similar programming languages.

Embodiments of the present disclosure are described herein with reference to flowchart illustrations and/or block diagrams of methods, apparatus (systems), and computer program products. It can be understood that each block of the flowchart illustrations and/or block diagrams, and/or combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions can also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts can be combined with operator or human implemented steps or acts in order to carry out an embodiment of this disclosure.

Thus, apparatus, systems, methods and computer program products are herein disclosed to generate predictive payment card holder profiles, to identify, analyze, extract and correlate payment card holder activities and characteristics, merchant information and sales technique information that represent an opportunity to determine payment card holder preference of certain sales techniques, to enable an entity (e.g., merchant) to employ a sales technique consistent with a payment card holder preference, and also an opportunity for predicting payment card holder behavior and intent. Embodiments of the present disclosure will leverage the information available to identify data that is indicative of a payment card holder's activities and characteristics, and to predict payment card holder behavior and intent based on those activities and characteristics (e.g., a preference for a certain sales technique). Such activities and characteristics can include, but are not limited to, spending behavior, merchant preference, sales technique preferences, geography, age, gender, and the like. By identifying and analyzing payment card holder activities and characteristics based on predictive payment card holder profiles, an entity (e.g., merchant) can be enabled to employ a sales technique consistent with the payment card holder preference.

Referring to the drawings and, in particular, FIG. 1, there is shown a four party payment (credit, debit or other) card system generally represented by reference numeral 100. In card system 100, card holder 120 submits the payment card to the merchant 130. The merchant's point of sale (POS) device communicates 132 with his acquiring bank or acquirer 140, which acts as a payment processor. The acquirer 140 initiates, at 142, the transaction on the payment card company network 150. The payment card company network 150 (that includes the financial transaction processing company) routes, via 162, the transaction to the issuing bank or card issuer 160, which is identified using information in the transaction message. The card issuer 160 approves or denies an authorization request, and then routes, via the payment card company network 150, an authorization response back to the acquirer 140. The acquirer 140 sends approval to the POS device of the merchant 130. Thereafter, seconds later, the card holder completes the purchase and receives a receipt.

The account of the merchant 130 is credited, via 170, by the acquirer 140. The card issuer 160 pays, via 172, the acquirer 140. Eventually, the card holder 120 pays, via 174, the card issuer 160.

Data warehouse 200 is a database used by payment card company network 150 for reporting and data analysis. According to one embodiment, data warehouse 200 is a central repository of data which is created by storing certain transaction data from transactions occurring within four party payment card system 100. According to another embodiment, data warehouse 200 stores, for example, the date, time, amount, location, merchant code, and merchant category for every transaction occurring within payment card network 150.

In yet another embodiment, data warehouse 200 stores, reviews, and/or analyzes information used in (i) constructing one or more definitions of payment card transactions and one or more payment card holder lists by payment card transactions, (ii) constructing one or more definitions of payment card transactions, one or more definitions of sales techniques, and one or more payment card holder lists by payment card transactions and by sales techniques, (iii) creating one or more groupings of payment card transactions, sales techniques, and payment card holder preferences for certain sales techniques, (iv) creating one or more datasets to store information relating to the one or more groupings of payment card transactions, sales techniques, and payment card holder preferences for certain sales techniques, and (v) creating one or more datasets to store information relating to predictive payment card holder profiles and associations between the one or more groupings of payment card transactions and sales techniques, and payment card holder preferences for certain sales techniques.

In still another embodiment, data warehouse 200 stores, reviews, and/or analyzes information used in creating one or more datasets to store information relating to the one or more groupings of payment card transactions, one or more groupings of merchants, and one or more groupings of sales techniques.

In another embodiment, data warehouse 200 stores, reviews, and/or analyzes information used in developing logic for creating one or more groupings of payment card transactions, one or more groupings of merchants, and one or more groupings of sales techniques, and applies the logic to a universe of payment card transactions, merchants and sales techniques to create associations between the payment card transactions, merchants and sales techniques.

In still another embodiment, data warehouse 200 stores, reviews, and/or analyzes information used in quantifying the strength of the one or more associations amongst the payment card transactions, merchants and sales techniques and the one or more groupings of payment card holder preferences for certain sales techniques.

In another embodiment, data warehouse 200 stores, reviews, and/or analyzes information, with respect to the one or more associations amongst the one or more payment card holders and the one or more groupings of payment card transactions and the one or more groupings of sales techniques, used in assigning attributes to the one or more payment card holders and the one or more groupings of payment card transactions and one or more groupings of sales techniques. The attributes are selected from the group consisting of one or more of confidence, time, and frequency.

In yet another embodiment, data warehouse 200 stores, reviews, and/or analyzes information used in identifying one or more payment card holders, one or more groupings of payment card transactions, and one or more groupings of sales techniques, and strength of the one or more associations between the one or more payment card holders and the one or more groupings of payment card transactions, and one or more groupings of sales techniques.

In still another embodiment, data warehouse 200 stores, reviews, and/or analyzes information used in generating one or more predictive payment card holder profiles, and one or more associations between the one or more payment card holders and the one or more groupings of payment card transactions, and one or more groupings of sales techniques.

In another embodiment, data warehouse 200 aggregates the information by merchant and/or category and/or location. In still another embodiment, data warehouse 200 integrates data from one or more disparate sources. Data warehouse 200 stores current as well as historical data and is used for creating reports, performing analyses on the network, merchant analyses, and performing predictive analyses.

Figure 2:
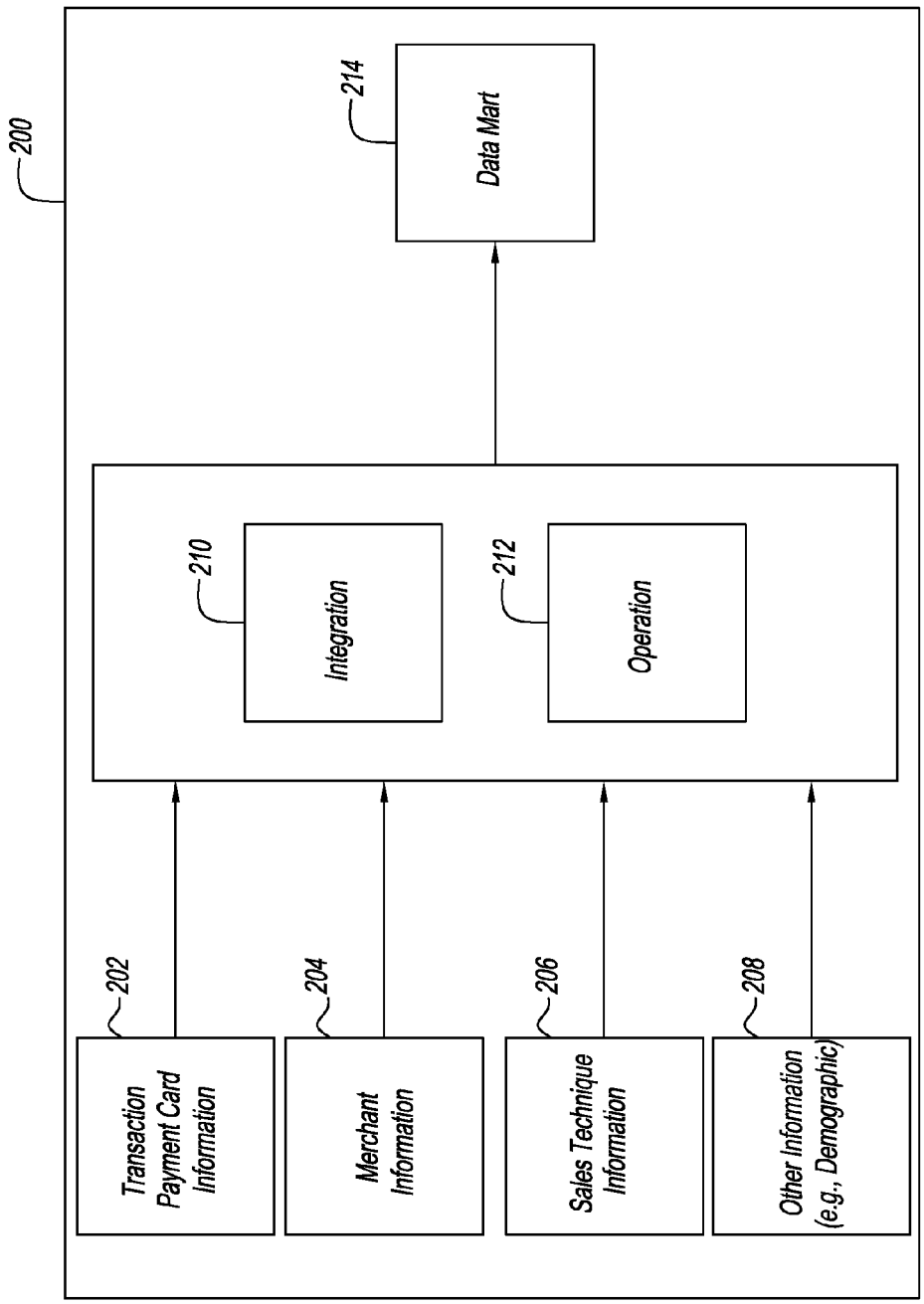
FIG. 2 illustrates a data warehouse shown in FIG. 1 that is a central repository of data which is created by storing certain transaction data from transactions occurring within four party payment card system of FIG. 1.

FIG. 2 illustrates an exemplary data warehouse 200 (the same data warehouse 200 in FIG. 1) for reporting and data analysis, including the storing, reviewing, and/or analyzing of information, for the various purposes described above. The data warehouse 200 can contain a plurality of entries (e.g., entries 202, 204, 206 and 208).

The payment card transaction information 202 can contain, for example, purchasing and payment activities attributable to purchasers (e.g., payment card holders), that is aggregated by merchant and/or category and/or location in the data warehouse 200. The merchant information 204 includes, for example, merchant name, merchant geography, merchant line of business, and the like. The sales technique information 206 includes, for example, any and all methods and approaches that sales people use to create revenue. Illustrative sales techniques include, for example, consultative selling, hard selling, heart selling, persuasive selling, Gum selling, solution selling, price-based selling, needs-based selling, relationship selling, action selling, and the like.

Other information 208 can include demographic or other suitable information that can be useful in constructing one or more definitions of payment card transactions and one or more payment card holder lists by payment card transactions; constructing one or more definitions of payment card transactions, one or more definitions of sales techniques, and one or more payment card holder lists by payment card transactions and by sales techniques; creating one or more groupings of payment card transactions, sales techniques, and payment card holder preferences for certain sales techniques; creating one or more datasets to store information relating to the one or more groupings of payment card transactions, sales techniques, and payment card holder preferences for certain sales techniques; and creating one or more datasets to store information relating to predictive payment card holder profiles and associations between the one or more groupings of payment card transactions and sales techniques, and payment card holder preferences for certain sales techniques.

The typical data warehouse uses staging, data integration, and access layers to house its key functions. The staging layer or staging database stores raw data extracted from each of the disparate source data systems. The integration layer integrates at 210 the disparate data sets by transforming the data from the staging layer often storing this transformed data in an operational data store database 212. For example, the payment card transaction information 202 can be aggregated by merchant and/or category and/or location at 210, and correlated with merchant information 204 and sales technique information 206 at 210. Also, the reporting and data analysis, including the storing, reviewing, and/or analyzing of information, for the various purposes described above, can occur in data warehouse 200. The integrated data is then moved to yet another database, often called the data warehouse database or data mart 214, where the data is arranged into hierarchical groups often called dimensions and into facts and aggregate facts. The access layer helps users retrieve data.

A data warehouse constructed from an integrated data source systems does not require staging databases or operational data store databases. The integrated data source systems can be considered to be a part of a distributed operational data store layer. Data federation methods or data virtualization methods can be used to access the distributed integrated source data systems to consolidate and aggregate data directly into the data warehouse database tables. The integrated source data systems and the data warehouse are all integrated since there is no transformation of dimensional or reference data. This integrated data warehouse architecture supports the drill down from the aggregate data of the data warehouse to the transactional data of the integrated source data systems.

The data mart 214 is a small data warehouse focused on a specific area of interest. For example, the data mart 214 can be focused on one or more of reporting and data analysis, including the storing, reviewing, and/or analyzing of information, for any of the various purposes described above. Data warehouses can be subdivided into data marts for improved performance and ease of use within that area. Alternatively, an organization can create one or more data marts as first steps towards a larger and more complex enterprise data warehouse.

This definition of the data warehouse focuses on data storage. The main source of the data is cleaned, transformed, cataloged and made available for use by managers and other business professionals for data mining, online analytical processing, market research and decision support. However, the means to retrieve and analyze data, to extract, transform and load data, and to manage the data dictionary are also considered essential components of a data warehousing system. Many references to data warehousing use this broader context. Thus, an expanded definition for data warehousing includes business intelligence tools, tools to extract, transform and load data into the repository, and tools to manage and retrieve metadata.

Algorithms can be employed to determine formulaic descriptions of the integration of the data source information using any of a variety of known mathematical techniques. These formulas in turn can be used to derive or generate one or more analyses and updates for analyzing, creating, comparing and identifying activities using any of a variety of available trend analysis algorithms. For example, these formulas can be used in the reporting and data analysis, including the storing, reviewing, and/or analyzing of information, for the various purposes described above.

Figure 3:
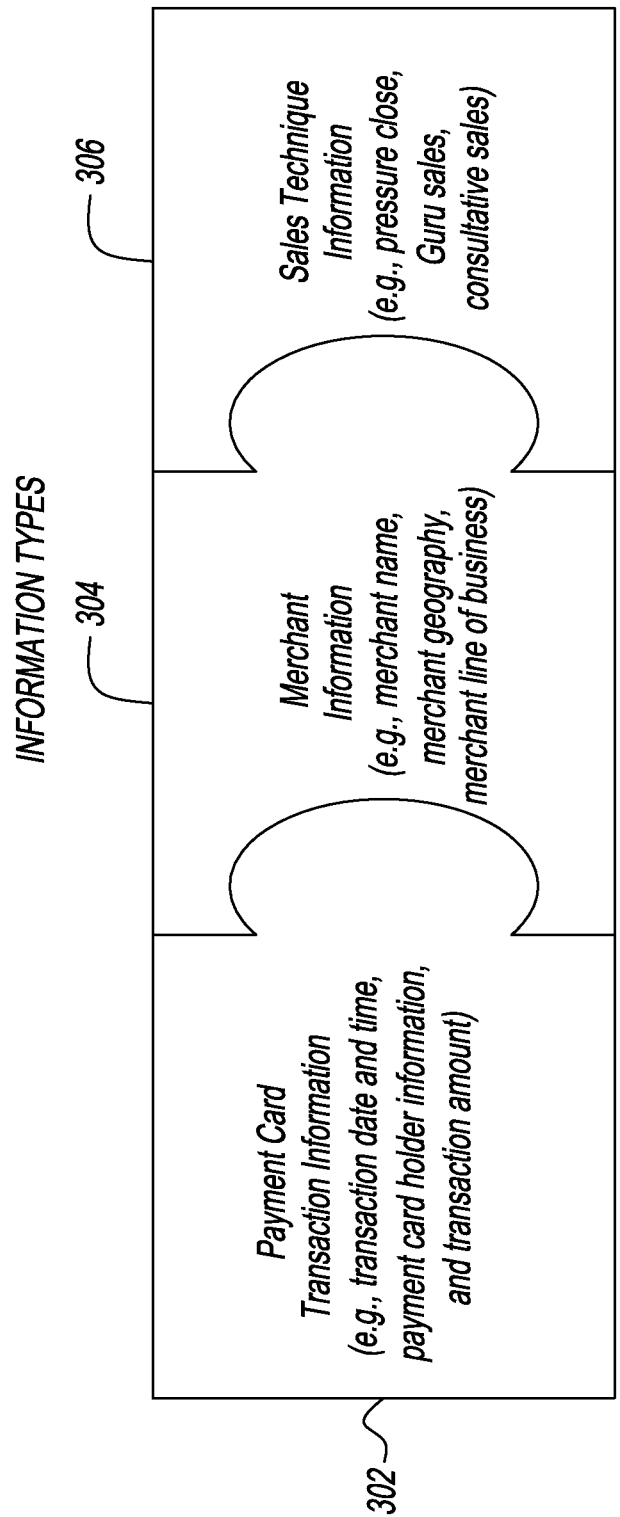
FIG. 3 shows illustrative information types used in the systems and the methods of the present disclosure.

In accordance with the method of this disclosure, information that is stored in one or more databases can be retrieved (e.g., by a processor). FIG. 3 shows illustrative information types used in the systems and methods of this disclosure.

The information can contain, for example, a first set of information including payment card transaction information 302. Illustrative first set of information can include, for example, transaction date and time, payment card holder information, and transaction amount. In particular, the payment card transaction information can include, for example, transaction date/time, payment card holder information (e.g., payment card holder account identifier (likely anonymized), payment card holder geography (potentially modeled), payment card holder type (consumer/business), payment card holder demographics, and the like), and payment transaction amount information. The first set of information includes information related to payment card transactions and actual spending. Information for inclusion in the first set of information can be obtained, for example, from payment card companies known as MasterCard®, Visa®, American Express®, and the like (part of the payment card company network 150 in FIG. 1).

The information can also contain, for example, a second set of information including merchant information 304 associated with payment card holder purchasing and payment activity. Illustrative second set of information can include, for example, merchant name, merchant address, merchant location(s) of business, merchant line of business or category, merchant geographic information, and the like.

The second set of information can include categorization of merchants. The one or more databases are used for storing profiles of one or more merchants, and merchants belonging to a particular category, e.g., industry category. Illustrative merchant categories are described herein. The merchant categorization is useful for identifying payment card holder preferences for a certain sales techniques for particular merchants. The payment card holder preferences can be different for each merchant category.

In an embodiment, a merchant category can include a segment of a particular industry (such as all merchants within a particular geographic region or merchants falling within a specific price range), all merchants in two or more industries (perhaps where merchants in the industries compete for the same customers), and the like. In some embodiments, the merchant category can be defined using merchant category codes according to predefined industries, which can be aligned using standard industrial classification codes, or using the industry categorization described herein.

Merchant categorization indicates the category or categories assigned to each merchant name. As described herein, merchant category information is used primarily for purposes of identifying payment card holder preferences for a certain sales techniques for particular merchants, although other uses are possible. According to one embodiment, each merchant name is associated with only one merchant category. In alternate embodiments, however, merchants are associated with a plurality of categories as apply to their particular businesses. Generally, merchants are categorized according to conventional industry codes as defined by a selected external source (e.g., a merchant category code (MCC), Hoovers™ the North American Industry Classification System (NAICS), and the like). However, in one embodiment, merchant categories are assigned based on system operator preferences, or some other similar categorization process.

An illustrative merchant categorization including industry codes is set forth below.

| INDUSTRY | INDUSTRY NAME |
| --- | --- |
| AAC | Children's Apparel |
| AAF | Family Apparel |
| AAM | Men's Apparel |
| AAW | Women's Apparel |
| AAX | Miscellaneous Apparel |
| ACC | Accommodations |
| ACS | Automotive New and Used Car Sales |
| ADV | Advertising Services |
| AFH | Agriculture/Forestry/Fishing/Hunting |
| AFS | Automotive Fuel |
| ALS | Accounting and Legal Services |
| ARA | Amusement, Recreation Activities |
| ART | Arts and Crafts Stores |
| AUC | Automotive Used Only Car Sales |
| AUT | Automotive Retail |
| BKS | Book Stores |
| BMV | Music and Videos |
| BNM | Newspapers and Magazines |
| BTN | Bars/Taverns/Nightclubs |
| BWL | Beer/Wine/Liquor Stores |
| CCR | Consumer Credit Reporting |
| CEA | Consumer Electronics/Appliances |
| CES | Cleaning and Exterminating Services |
| CGA | Casino and Gambling Activities |
| CMP | Computer/Software Stores |
| CNS | Construction Services |
| COS | Cosmetics and Beauty Services |
| CPS | Camera/Photography Supplies |
| CSV | Courier Services |
| CTE | Communications, Telecommunications Equipment |
| CTS | Communications, Telecommunications, Cable Services |
| CUE | College, University Education |
| CUF | Clothing, Uniform, Costume Rental |
| DAS | Dating Services |
| DCS | Death Care Services |
| DIS | Discount Department Stores |
| DLS | Drycleaning, Laundry Services |
| DPT | Department Stores |
| DSC | Drug Store Chains |
| DVG | Variety/General Merchandise Stores |
| EAP | Eating Places |
| ECA | Employment, Consulting Agencies |

-continued

| INDUSTRY | INDUSTRY NAME |
|---|---|
| EHS | Elementary, Middle, High Schools |
| EQR | Equipment Rental |
| ETC | Miscellaneous |
| FLO | Florists |
| FSV | Financial Services |
| GHC | Giftware/Houseware/Card Shops |
| GRO | Grocery Stores |
| GSF | Specialty Food Stores |
| HBM | Health/Beauty/Medical Supplies |
| HCS | Health Care and Social Assistance |
| HFF | Home Furnishings/Furniture |
| HIC | Home Improvement Centers |
| INS | Insurance |
| IRS | Information Retrieval Services |
| JGS | Jewelry and Giftware |
| LEE | Live Performances, Events, Exhibits |
| LLS | Luggage and Leather Stores |
| LMS | Landscaping/Maintenance Services |
| MAS | Miscellaneous Administrative and Waste Disposal Services |
| MER | Miscellaneous Entertainment and Recreation |
| MES | Miscellaneous Educational Services |
| MFG | Manufacturing |
| MOS | Miscellaneous Personal Services |
| MOT | Movie and Other Theatrical |
| MPI | Miscellaneous Publishing Industries |
| MPS | Miscellaneous Professional Services |
| MRS | Maintenance and Repair Services |
| MTS | Miscellaneous Technical Services |
| MVS | Miscellaneous Vehicle Sales |
| OPT | Optical |
| OSC | Office Supply Chains |
| PCS | Pet Care Services |
| PET | Pet Stores |
| PFS | Photofinishing Services |
| PHS | Photography Services |
| PST | Professional Sports Teams |
| PUA | Public Administration |
| RCP | Religious, Civic and Professional Organizations |
| RES | Real Estate Services |
| SGS | Sporting Goods/Apparel/Footwear |
| SHS | Shoe Stores |
| SND | Software Production, Network Services and Data Processing |
| SSS | Security, Surveillance Services |
| TAT | Travel Agencies and Tour Operators |
| TEA | T + E Airlines |
| TEB | T + E Bus |
| TET | T + E Cruise Lines |
| TEV | T + E Vehicle Rental |
| TOY | Toy Stores |
| TRR | T + E Railroad |
| TSE | Training Centers, Seminars |
| TSS | Other Transportation Services |
| TTL | T + E Taxi and Limousine |
| UTL | Utilities |
| VES | Veterinary Services |
| VGR | Video and Game Rentals |
| VTB | Vocation, Trade and Business Schools |
| WAH | Warehouse |
| WHC | Wholesale Clubs |
| WHT | Wholesale Trade |

Illustrative merchants and industry categorization are shown in FIG. 4. The illustrative industry categories include Automotive Fuel (AFS), Grocery Stores (GRO), Eating Places (EAP), and Accommodations (ACC). Illustrative merchants associated with the industry categories are listed in FIG. 4. In accordance with this disclosure, merchant categorization is important for identifying payment card holder preferences for a certain sales techniques for particular merchants. Proper merchant categorization is important to obtain payment card holder preference results that are truly reflective of the particular merchant and industry, in particular, to determine how payment card holder preference can be different for one merchant in comparison to another merchant in the same industry category.

The information can also contain, for example, a third set of information including sales technique information. The sales technique information includes any and all methods and approaches that sales people use to create revenue. Illustrative sales techniques include, for example, consultative selling, hard selling, heart selling, persuasive selling, Gum selling, solution selling, price-based selling, needs-based selling, relationship selling, action selling, and the like. The sales technique information can be obtained from third party sources known in the art.

In accordance with this disclosure, the second set of information, including merchant information associated with payment card holder purchasing and payment activity, can be supplemented or leveraged to enable accurate identification of payment card holder preferences for a certain sales techniques. Illustrative leveraged data sources can include geographic data, firmographics (e.g., line of operations for a business, information related to merchant employees and revenues), risk (e.g., overall credit worthiness of a merchant), and attitudinal (e.g., information related to payment card holder dynamics, satisfaction and concerns with a merchant). These leveraged data sources can supplement information in the second set of information.

Referring to FIG. 2, the other information 208 can include, for example, geographic areas (e.g., zip codes, metropolitan areas (metropolitan statistical area (MSA), designated market area (DMA), and the like). The other information can be categorized, for example, by country, state, zip code, and the like. The geolocations can be clustered (i.e., location clusters) by category, for example, by merchants, activities, events, or other categories. The other information can also include map data (e.g., highway exits, travel time, rest areas, nearest airport, and the like), The other information 208 can further include firmographics data, for example, line of operations for a business, information related to employees, revenues and industries, and the like. In particular, the firmographics data relates to information on merchants that is typically used in credit decisions, business-to-business marketing and supply chain management.

Illustrative information in the firmographics data source includes, for example, information concerning merchant background, merchant history, merchant special events, merchant operation, merchant payments, merchant payment trends, merchant financial statement, merchant public filings, and the like merchant information.

Merchant background information can include, for example, ownership, history and principals of the merchant, and the operations and location of the merchant.

Merchant history information can include, for example, incorporation details, par value of shares and ownership information, background information on management, such as educational and career history and company principals, related companies including identification of affiliates including, but not limited to, parent, subsidiaries and/or branches worldwide. The merchant history information can also include corporate registration details to verify the existence of a registered organization, confirm legal information such as a merchant's organizational structure, date and state of incorporation, and research possible fraud by reviewing names of principals and business standing within a state.

Merchant special event information can include, for example, any developments that can impact a potential relationship with a company, such as bankruptcy filings, changes in ownership, acquisitions and other events. Other special event information can include announcements on the release of earnings reports. Special events can help explain unusual company trends, for example, a change in ownership could have an impact on manner of payment, or decreased production may reflect an unexpected interruption in factory operations (i.e., labor strike or fire).

Merchant operational information can include, for example, the identity of the parent company, the number of accounts and geographic scope of the business, typical selling terms, and whether the merchant owns or leases its facilities. The names and locations of branch operations and subsidiaries can also be identified.

Merchant payment information can include, for example, a listing of recent payments made by a company. An unusually large number of transactions during a single month or time period can indicate a seasonal purchasing pattern. The information can show payments received prior to date of invoice, payments received within trade discount period, payments received within terms granted, and payments beyond vendor's terms.

Merchant payment trend information can include, for example, information that spots trends in a merchant's business by analyzing how it pays its bills.

Merchant financial statement information can include, for example, a formal record of the financial activities and a snapshot of a merchant's financial health. Financial statements typically include four basic financial statements, accompanied by a management discussion and analysis. The Balance Sheet reports on a company's assets, liabilities, and ownership equity at a given point in time. The Income Statement reports on a company's income, expenses, and profits over a period of time. Profit & Loss accounts provide information on the operation of the enterprise. These accounts include sale and the various expenses incurred during the processing state. The Statement of Retained Earnings explains the changes in a company's retained earnings over the reporting period. The Statement of Cash Flows reports on a company's cash flow activities, particularly its operating, investing and financing activities.

Merchant public filing information can include, for example, bankruptcy filings, suits, liens, and judgment information obtained from Federal and State court houses for a company.

The risk data source includes information related to overall credit worthiness of a merchant including open lines of credit, utilization and risk score. In particular, information for inclusion in the risk data source relates to information concerning credit services, marketing services, decision analytics and consumer services. The risk data source can also include information on people, businesses, motor vehicles and insurance. The risk data source can further include 'lifestyle' data from on-line and off-line surveys.

The attitudinal data source includes information related to payment card holder dynamics, satisfaction and concerns. Information for inclusion in the attitudinal data source can be obtained, for example, from payment card companies known as MasterCard®, Visa®, American Express®, and the like (part of the payment card company network 150 in FIG. 1).

The attitudinal information can contain, for example, information from surveys conducted by the financial transaction processing entity (e.g., a payment card company), spending behaviors, payment behaviors, growth opportunities, attitudes in the industry, supply and demand, product trends, and the like.

Advertisement data can include information concerning all forms of advertising including, for example, billboard advertisements on a highway, advertisements on highway road signs, and the like.

While accurate and up-to-date payment card transaction data and merchant data are of primary concern for determining payment card holder preference for a certain sales techniques, the additional information described above can also be useful in more fully understanding the merchant and/or contributing to the overall assessment of the payment card holder preference.

With regard to the sets of information, filters can be employed to select particular portions of the information. For example, time range filters can be used that can vary based on need or availability.

In an embodiment, all information stored in each of the one or more databases can be retrieved. In another embodiment, only a single entry in each database can be retrieved. The retrieval of information can be performed a single time, or can be performed multiple times.

Figure 5:
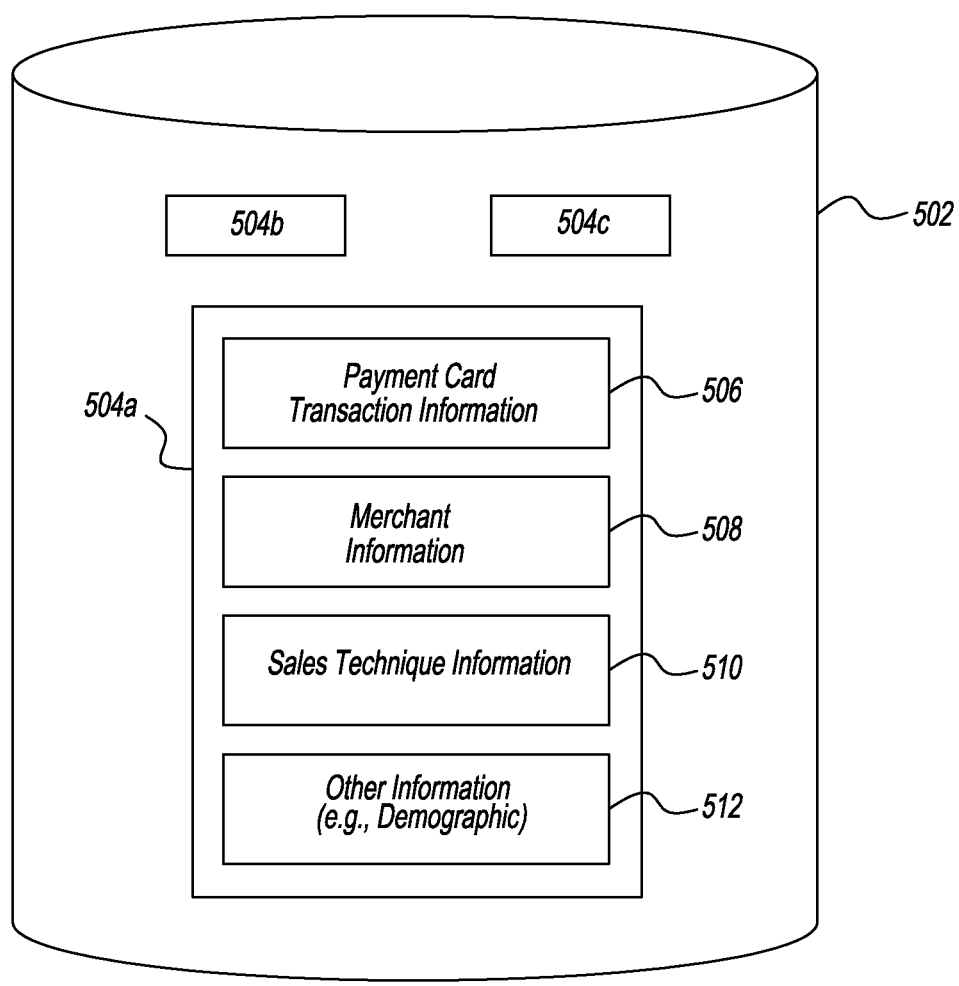
FIG. 5 illustrates an exemplary dataset for the storing, reviewing, and/or analyzing of information used in the systems and the methods of the present disclosure.

Referring to FIG. 5, exemplary dataset 502 stores, reviews, and/or analyzes information used in the systems and methods of this disclosure. The dataset 502 can contain a plurality of entries (e.g., entries 504a, 504b, and 504c).

As described herein, the payment card holder transaction information 506 includes payment card transactions and actual spending. The payment card transaction information 506 can contain, for example, transaction date/time, payment card holder information (e.g., payment card holder account identifier (likely anonymized), payment card holder geography (potentially modeled), payment card holder type (consumer/business), payment card holder demographics, and the like), merchant information (e.g., merchant name, merchant geography, merchant line of business, and the like), payment transaction amount information, and the like.

Also, as described herein, the merchant information 508 includes merchant name, merchant address, merchant location(s) of business, merchant line of business or category, merchant geographic information, and the like.

Further, as described herein, the sales technique information 510 can include any and all methods and approaches that sales people use to create revenue. Illustrative sales techniques include, for example, consultative selling, hard selling, heart selling, persuasive selling, Gum selling, solution selling, price-based selling, needs-based selling, relationship selling, action selling, and the like.

The other information 512 includes, for example, demographic or other suitable information that can be useful in conducting the systems and methods of this disclosure.

Algorithms can be employed to determine formulaic descriptions of the integration of the payment card transaction information, the merchant information and the sales technique information using any of a variety of known mathematical techniques. These formulas, in turn, can be used to derive or generate one or more analyses and updates for identifying associations between the payment card transaction information, the merchant information and the sales technique information, and generating one or more predictive payment card holder profiles, using any of a variety of available trend analysis algorithms. For example, these formulas can be used to construct one or more definitions of payment card transactions and one or more payment card holder lists by payment card transactions; construct one or more definitions of payment card transactions, one or more definitions of sales techniques, and one or more payment card holder lists by payment card transactions and by sales techniques; create one or more groupings of payment card transactions, sales techniques, and payment card holder preferences for certain sales techniques; create one or more datasets to store information relating to the one or more groupings of payment card transactions, sales techniques, and payment card holder preferences for certain sales techniques; and create one or more datasets to store information relating to predictive payment card holder profiles and associations between the one or more groupings of payment card transactions and sales techniques, and payment card holder preferences for certain sales techniques.

In an embodiment, logic is developed for creating one or more groupings of payment card transactions, one or more groupings of merchants, and one or more groupings of sales techniques. The logic is applied to a universe of payment card transactions, merchants and sales techniques to create associations between the payment card transactions, merchants and sales techniques.

In accordance with the method of this disclosure, information that is stored in one or more databases can be retrieved (e.g., by a processor). The information can contain, for example, billing activities attributable to the financial transaction processing entity (e.g., a payment card company) and purchasing and payment activities, including date and time, attributable to the payment card holders, merchant information including geographic (e.g., zip code and state or country of residence), sales technique information, and the like. Other information can include, for example, geographic data, firmographic information, advertisement data, demographic information, and the like. Still other illustrative information can include, for example, demographic (e.g., age and gender), and the like.

In an embodiment, all information stored in each database can be retrieved. In another embodiment, only a single entry in each of the one or more databases can be retrieved. The retrieval of information can be performed a single time, or can be performed multiple times. In an exemplary embodiment, only information pertaining to a specific predictive payment card holder profile is retrieved from each of the databases.

In accordance with this disclosure, a high level process flow involves, for each payment card transaction at a merchant; determining logical payment card holder groups, merchant groups, industry groupings, geographies, and the like; storing granular information that captures payment card holder preference for a certain sales technique in a database; aggregating the data at various levels (e.g., payment card holder level, merchant level, geography, and the like); and delivering a feed of data that can be used for one of the several applications of this disclosure.

Figure 6:
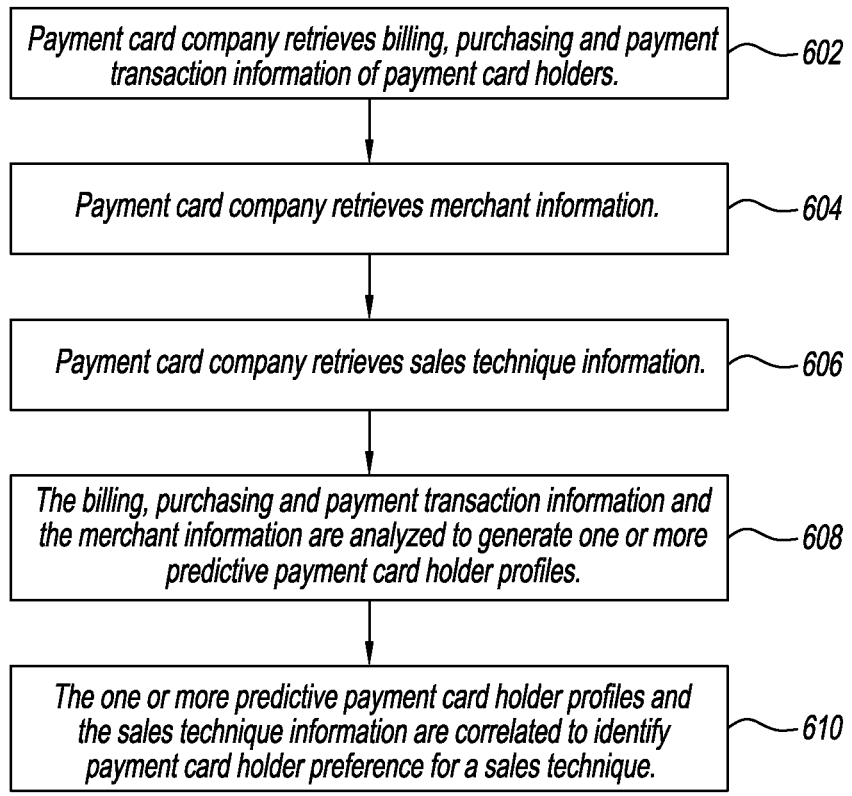
FIG. 6 is a block diagram illustrating a method for determining payment card holder preferences for certain sales techniques in accordance with exemplary embodiments of the present disclosure.

In accordance with the method of this disclosure, payment card holder preferences for a certain sales techniques can be determined. Referring to FIG. 6, the method includes a payment card company (part of the payment card company network 150 in FIG. 1) retrieving, from one or more databases, information including activities and characteristics attributable to one or more payment card holders. The information 602 comprises payment card billing, purchasing and payment transactions, and optionally demographic and/or geographic information. The payment card company also retrieves, from one or more databases, information including merchant information 604 attributable to one or more payment card holders. The merchant information 604 includes, for example, merchant name, merchant geography, merchant line of business, and the like. The payment card company further retrieves, from one or more databases, sales technique information 606. The sales technique information 606 includes any and all methods and approaches that sales people use to create revenue. Illustrative sales techniques include, for example, consultative selling, hard selling, heart selling, persuasive selling, Gum selling, solution selling, price-based selling, needs-based selling, relationship selling, action selling, and the like. Other information may also be retrieved, for example, geographic data, firmographic information, advertisement data, and the like.

The purchasing and payment activity information attributable to one or more payment card holders 602 and the merchant information 604 are analyzed at 608 to generate one or more one or more predictive payment card holder profiles.

The one or more predictive payment card holder profiles can then be correlated at 610 with the sales technique information. One or more predictive payment card holder profiles are generated at 608 based on the behavioral information and intent of the one or more payment card holders. The one or more payment card holders have a propensity to carry out certain activities at certain times based on the one or more predictive payment card holder profiles.

The predictive payment card holder profiles can help identify which sales technique a payment card holder prefers. For example, a payment card holder prefers a low pressure sales technique to a high pressure sales technique for most merchant categories. The choice can further be quantified, for example, a payment card holder prefers a low pressure sales technique to a high pressure sales technique in 3 out of 4 occasions depending on the particular merchant category.

One or more algorithms can be employed to predict which sales technique a payment card holder will prefer, using any of a variety of known mathematical techniques. For example, a payment card holder's purchases can be examined during the first 6 month period of a calendar year (pre-period). The preferences are recorded that the same payment card holder displayed during the second 6 month period of a calendar year (post-period). An algorithm is then developed that will use the pre-period data to predict post-period activity. Standard statistical techniques (e.g., clustering, regression, correlation, segmentation, raking, and the like) can be used to develop an algorithm that will use the pre-period data to predict post-period activity. The output of the algorithms can include formulas for determining a sales technique preference, a method of quantifying the strength of the prediction, for example, a strong preference or a weak preference.

Payment card holder preference of a particular sales technique can be determined at 610 based on the one or more predictive payment card holder profiles.

An infrastructure can be created to parse the compiled data and generate a prediction. For example, general data (e.g., transaction data) and/or purpose-built data (e.g., preference quantifier) is read, a prediction is generated, and the prediction is stored and made available to downstream processes.

Outputs from the method are many and include, for example, payment card holder identification, merchant identification, competitive set identification, payment card holder preference, quantification of payment card holder preference (e.g., strength of the prediction), and the like.

In accordance with the method of this disclosure, one or more predictive payment card holder profiles are generated based at least in part on the first set of information, the second set of information and the third set of information. Predictive payment card holder profiles can be selected based on the information obtained and stored in the one or more databases. The selection of information for representation in the predictive payment card holder profiles can be different in every instance. In one embodiment, all information stored in each database can be used for selecting predictive payment card holder profiles. In an alternative embodiment, only a portion of the information is used. The generation and selection of predictive payment card holder profiles can be based on specific criteria.

Predictive payment card holder profiles are generated from the information obtained from each database. The information is analyzed, extracted and correlated by, for example, a financial transaction processing company (e.g., a payment card company), and can include financial account information, merchant information, sales technique information, performing statistical analysis on financial account information, the merchant information and the sales technique information, finding correlations between account information, merchant information, sales technique information and payment card holder behaviors, predicting future payment card holder behaviors based on account information, merchant information and sales technique information, relating information on a financial account, a merchant and sales technique information with other financial accounts, merchants and sales technique information, or any other method of review suitable for the particular application of the data, which will be apparent to persons having skill in the relevant art.

Activities and characteristics attributable to the payment card holders based on the one or more predictive payment card holder profiles are identified. The payment card holders have a propensity to carry out certain activities and to exhibit certain characteristics based on the one or more predictive payment card holder profiles. The activities and characteristics attributable to the payment card holders and based on the one or more predictive payment card holder profiles are conveyed by the financial transaction processing entity to the entity (e.g., merchant). This conveyance enables the entity to employ a sales technique consistent with a payment card holder preference. The transmittal can be performed by any suitable method as will be apparent to persons having skill in the relevant art.

Predictive payment card holder profiles can be defined based on geographical or demographical information, including but not limited to, geography, age, gender, income, marital status, postal code, income, spending propensity, and familial status. In some embodiments, predictive payment card holder profiles can be defined by a plurality of geographical and/or demographical categories. For example, a predictive payment card holder profile can be defined for any card holder who engages in spending activity at a merchant.

Predictive payment card holder profiles can also be based on behavioral variables. For example, the financial transaction processing entity database can store information relating to financial transactions. The information can be used to determine an individual's likeliness to spend at a particular merchant. An individual's likeliness to spend can be represented generally, or with respect to a particular industry (e.g., electronics), retailer (e.g., Macy's®), brand (e.g., Apple®), or any other criteria that can be suitable as will be apparent to persons having skill in the relevant art. An individual's behavior can also be based on additional factors, including but not limited to, time, location, and season. For example, a predictive payment card holder profile can be based on payment card holders, and payment card holder preferences for a certain sales techniques, payment card holders who are likely to spend on electronics during the holiday season, or on sporting goods throughout the year. The factors and behaviors identified can vary widely and can be based on the application of the information.

Behavioral variables can also be applied to generated predictive payment card holder profiles, including payment card holder preference for a certain sales technique, based on the attributes of the entities. For example, a predictive payment card holder profile of specific geographical and demographical attributes can be analyzed for spending behaviors. Results of the analysis can be assigned to the predictive payment card holder profiles.

In an embodiment, the information retrieved from each of the databases can be analyzed to determine behavioral information of the payment card holders. Also, information related to an intent of the payment card holders can be extracted from the behavioral information. The predictive payment card holder profiles can be based upon the behavioral information of the payment card holders and the intent of the payment card holders. The predictive payment card holder profiles can be capable of predicting behavior and intent in the payment card holders (e.g., predicting payment card holder preference for a certain sales technique).

Figure 7:
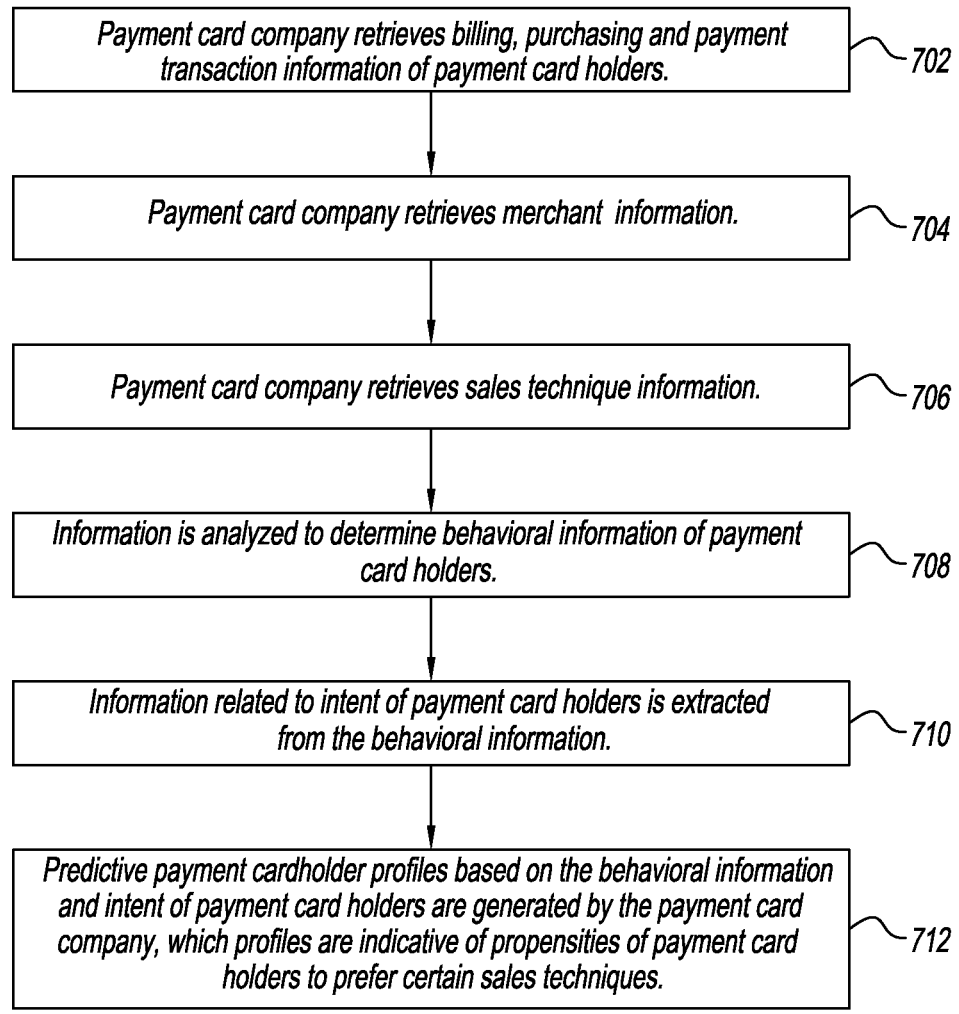
FIG. 7 is a block diagram illustrating a method for generating one or more predictive payment card holder profiles in accordance with exemplary embodiments of the present disclosure.

A method for generating one or more predictive payment card holder profiles is an embodiment of this disclosure. Referring to FIG. 7, the method involves a payment card company (part of the payment card company network 150 in FIG. 1) retrieving, from one or more databases, information including activities and characteristics attributable to one or more payment card holders at 702. The information at 702 comprises payment card billing, purchasing and payment transactions, and optionally demographic and/or geographic information. The payment card company also retrieves, from one or more databases, information including merchant information at 704 attributable to one or more payment card holders. The merchant information at 704 includes, for example, merchant name, merchant geography, merchant line of business, and the like. The payment card company further retrieves, from one or more databases, sales technique information at 706. The sales technique information at 706 includes any and all methods and approaches that sales people use to create revenue. Illustrative sales techniques include, for example, consultative selling, hard selling, heart selling, persuasive selling, Gum selling, solution selling, price-based selling, needs-based selling, relationship selling, action selling, and the like. Other information can also be retrieved, for example, geographic data, firmographic information, advertisement data, and the like.

The information is analyzed at 708 to determine behavioral information of the one or more payment card holders. Information related to an intent of the one or more payment card holders is extracted from the behavioral information at 710. One or more predictive payment card holder profiles are generated at 712 based on the behavioral information and intent of the one or more payment card holders. The one or more payment card holders have a propensity to carry out certain activities based on the one or more predictive payment card holder profiles (e.g., a propensity of the payment card holder to prefer a certain sales technique).

In analyzing information to determine behavioral information, intent (payment card holder) and other payment card holder attributes are considered. Developing intent of payment card holders involves profiles that predict specific spend behavior at certain times in the future and desirable spend behaviors at certain dates and times.

Predictive payment card holder profiles can equate to purchase behaviors. There can be different degrees of predictive payment card holder profiles with the ultimate behavior being a purchase.

There is the potential for numerous predictive payment card holder profiles including, for example, merchants/industries (e.g., consumer electronics, QSR), categories (e.g., online spend, cross border), geography spend (e.g., spend in New York City, spend in London), geography residence (e.g., live in New York City, live in Seattle), day/time spend (e.g., weekday spend, lunch time spend), calendar spend (e.g., spend a lot around Christmas, spend a lot on flowers before Valentine's Day), top number of merchants, and the like.

The payment card holder profiles and information can be collected and aggregated at the transaction level. The payment card holder profiles and information can be aggregated by customer.

Other payment card holder attributes part of the information include, for example, demographics (e.g., age, gender, and the like).

The method further includes conveying to an entity (e.g., merchant) a propensity of the payment card holder to prefer a certain sales technique based on the one or more predictive payment card holder profiles, to enable the entity to employ a sales technique consistent with a payment card holder preference. The one or more predictive payment card holder profiles are capable of predicting behavior and intent in the one or more payment card holders. The one or more payment card holders are people and/or businesses; the activities attributable to the one or more payment card holders are financial transactions associated with the one or more payment card holders; and the characteristics attributable to the one or more payment card holders are sales technique preference, geographical characteristics and/or demographics of the one or more payment card holders.

A behavioral propensity score is used for conveying to the entity the activities and characteristics attributable to the one or more payment card holders based on the one or more predictive payment card holder profiles. The behavioral propensity score is indicative of a propensity to exhibit a certain behavior. The behavioral propensity score is a payment card holder preference score that is used for conveying to an entity a propensity of the payment card holder to prefer a certain sales technique.

A financial transaction processing company can analyze the generated predictive payment card holder profiles (e.g., by analyzing the stored data for each entity comprising the predictive payment card holder profile) for behavioral information (e.g., sales technique preferences, spend behaviors and propensities). In some embodiments, the behavioral information can be represented by a behavioral propensity score. Behavioral information can be assigned to each corresponding predictive payment card holder profile.

Predictive payment card holder profiles or behavioral information can be updated or refreshed at a specified time (e.g., on a regular basis or upon request of a party). Updating predictive payment card holder profiles can include updating the entities included in each predictive payment card holder profile with updated demographic data and/or updated financial data and/or updated merchant data or updated sales technique preferences. Predictive payment card holder profiles can also be updated by changing the attributes that define each predictive payment card holder profile, and generating a different set of behaviors. The process for updating behavioral information can depend on the circumstances regarding the need for the information itself.

Although the above methods and processes are disclosed primarily with reference to financial data, merchant data, sales technique data and spending behaviors, it will be apparent to persons having skill in the relevant art that the predictive payment card holder profiles can be beneficial in a variety of other applications. Predictive payment card holder profiles can be useful in the evaluation of payment card holder data that may need to be protected.

Predictive payment card holder profile data can also be combined or matched with other sources of data. For example, other transaction processing agencies, advertising firms, advertising networks, publishers, and the like can provide information on consumer groupings of their own. The financial transaction processing company can link or match the received consumer groupings, such as by matching groupings to generated predictive payment card holder profiles based on geographical or demographical data.

Figure 8:
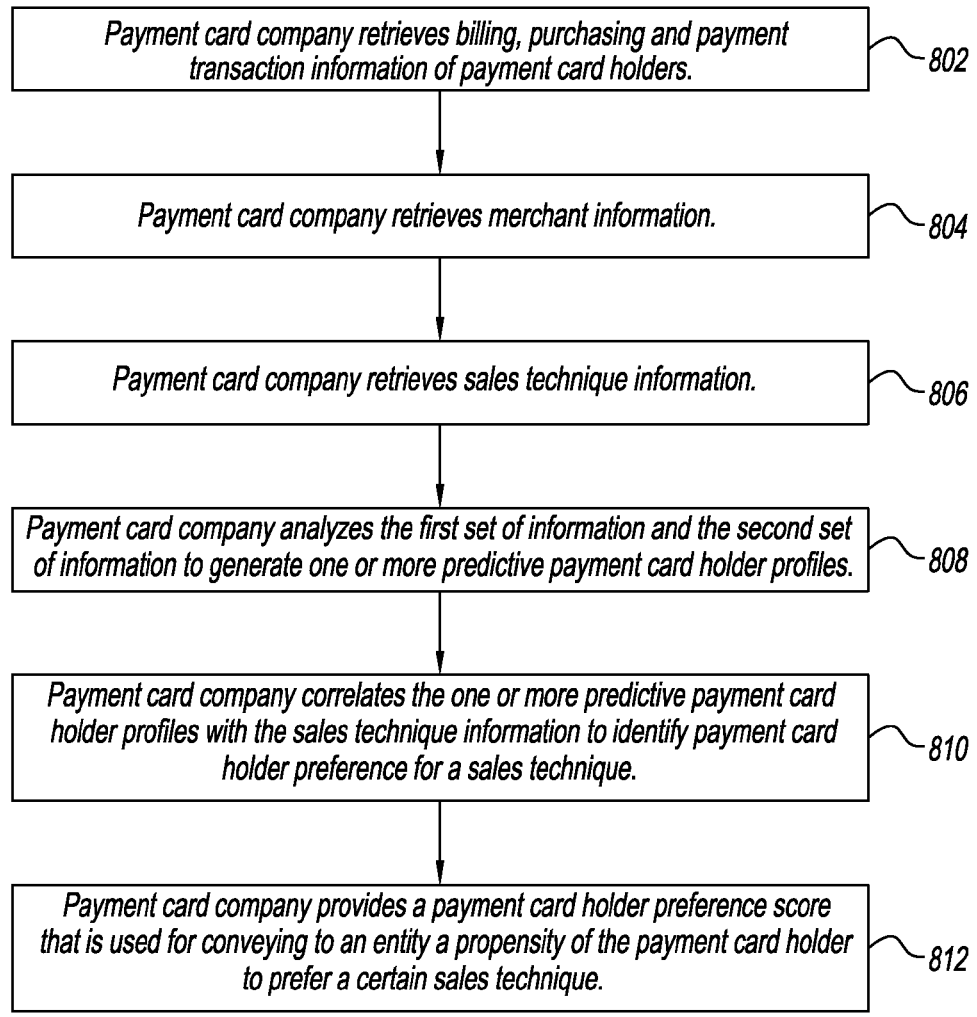
FIG. 8 is a block diagram illustrating a method for enabling an entity (e.g., merchant) to employ a sales technique consistent with a payment card holder preference in accordance with exemplary embodiments of the present disclosure.

Referring to FIG. 8, an exemplary method is shown for enabling an entity (e.g., merchant) to employ a sales technique consistent with a payment card holder preference. In step 802, a payment card company (part of the payment card company network 150 in FIG. 1) retrieves, from one or more databases, information including activities and characteristics attributable to one or more payment card holders. The information at 802 comprises payment card billing, purchasing and payment transactions, and optionally demographic and/or geographic information. The payment card company also retrieves, from one or more databases, information including merchant information at 804 attributable to one or more payment card holders. The merchant information at 804 includes, for example, merchant name, merchant geography, merchant line of business, and the like. The payment card company further retrieves, from one or more databases, sales technique information at 806. The sales technique information at 806 includes any and all methods and approaches that sales people use to create revenue. Illustrative sales techniques include, for example, consultative selling, hard selling, heart selling, persuasive selling, Gum selling, solution selling, price-based selling, needs-based selling, relationship selling, action selling, and the like. Other information can also be retrieved, for example, geographic data, firmographic information, advertisement data, and the like.

The purchasing and payment activity information attributable to one or more payment card holders at 802 and the merchant information at 804 are analyzed at 808 to generate one or more one or more predictive payment card holder profiles.

The one or more predictive payment card holder profiles can then be correlated at 810 with the sales technique information. One or more predictive payment card holder profiles are generated at 808 based on the behavioral information and intent of the one or more payment card holders. The one or more payment card holders have a propensity to carry out certain activities at certain times based on the one or more predictive payment card holder profiles.

The payment card company generates predictive payment card holder profiles based on the purchasing and payment activity information, merchant information and sales technique information, and identifies activities and characteristics attributable to potential purchasers based on the predictive payment card holder profiles. Activities and characteristics attributable to the payment card holders are identified based on the one or more predictive payment card holder profiles. The payment card holders have a propensity to carry out certain activities and to exhibit certain characteristics based on the one or more predictive payment card holder profiles.

The activities and characteristics attributable to the payment card holders based on the one or more predictive payment card holder profiles are conveyed to an entity (e.g., merchant) at 812, to enable the entity to employ a sales technique consistent with a payment card holder preference. In an embodiment, the payment card company conveys to the entity at 812 a behavioral propensity score based on the predictive payment card holder profiles. The score is indicative of a propensity of a potential purchaser to exhibit a certain behavior (e.g., a propensity of the payment card holder to prefer a certain sales technique).

In step 812, the predictive payment card holder profiles are used to predict behavior and intent in payment card holders (e.g., the above predictive payment card holder profile examples are used to predict payment card holder preference of a certain sales technique).

In an embodiment, the entity provides feedback to the payment card company to enable the payment card company to monitor and track impact of payment card holder preference for certain sales techniques. This "closed loop" system allows an entity to track sales techniques used, measure efficiency of the sales techniques used, and make any improvements for the next round of campaigns.

One or more algorithms can be employed to determine formulaic descriptions of the assembly of the payment card holder information including payment card billing, purchasing and payment transactions, merchant information, sale technique information, and other information (e.g., demographic and/or geographic information), using any of a variety of known mathematical techniques. These formulas, in turn, can be used to derive or generate one or more predictive payment card holder profiles using any of a variety of available trend analysis algorithms.

Figure 9:
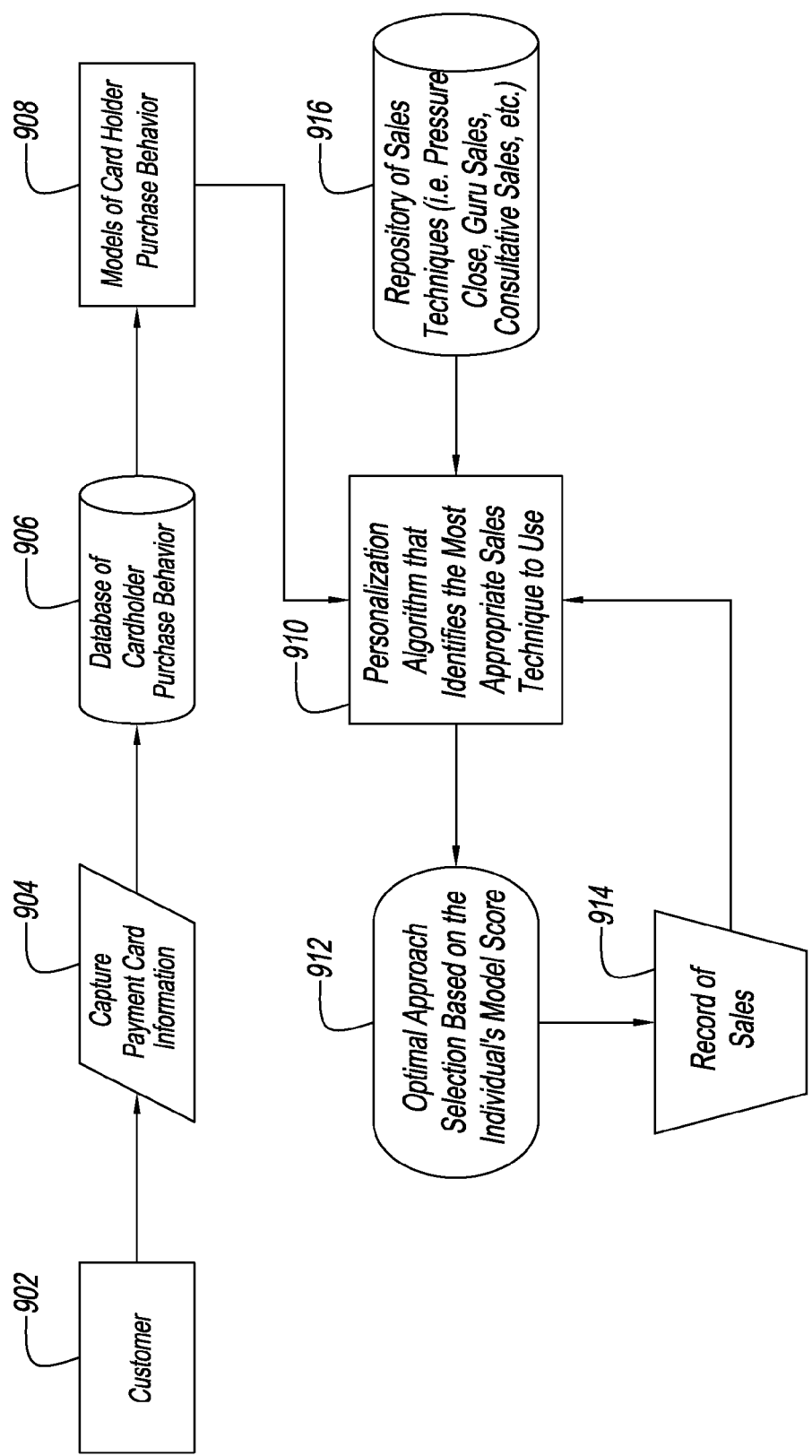
FIG. 9 is a process flow chart illustrating a method for enabling an entity (e.g., merchant) to employ a sales technique consistent with a payment card holder preference in accordance with exemplary embodiments of the present disclosure.

FIG. 9 illustrates an exemplary process flow for carrying out the method of this disclosure. At 902, a customer enters a merchant store. Payment card holder information is captured at 904. Different methods can be used for capturing payment card holder information. For example, the customer can opt in by scanning their payment card when they enter the merchant store in exchange for coupons. Radio frequency identification (RFID) readers can also be used. As shoppers enter through the doors of the merchant store, payment card information is captured.

In accordance with this disclosure, one or more boxes with RFID readers for every type of RFID tag (credit cards, access cards, loyalty cards, driver's licenses, and the like) can be installed inside selected doors of a retail environment, e.g., a shopping mall. As shoppers enter the doors and are forced to walk within the range of the readers, all available RFID information is read and correlated together. Long range RFID readers are used to track the shopper as they walk around the retail environment in real time.

The information collected includes, for example, credit card details (card numbers, expiry date, and the like), consumer residence, details of purchases made, and the like. The data is processed by a modeling engine in a database of payment card holder purchase information (e.g., behavior information) at 906 that generates models of payment card holder purchase behavior at 908.

RFID is a technology that uses radio waves to transfer data from an electronic tag, called an RFID tag, label or secure data card, attached to an object, through a reader for the purpose of identifying and tracking or monitoring the object. Some RFID tags can be read from several meters away and beyond the line of sight of the reader. The application of bulk reading enables an almost-parallel reading of tags.

The tag's information is stored electronically. The RFID tag includes a small RF transmitter and receiver. An RFID reader transmits an encoded radio signal to interrogate the tag. The tag receives the message and responds with its identification information. Most RFID tags contain at least two parts: one part is an integrated circuit (i.e. the RFID chip) for storing and processing information, modulating and demodulating a radio-frequency (RF) signal, and other specialized functions; and the other part is an antenna for receiving and transmitting the signal.

RFID tags can be either passive, active or battery assisted passive. Passive RFID does not use a battery. Instead, the tag uses the radio energy transmitted by the reader as its sole energy source. An active tag has an on-board battery that always broadcasts or beacons its signal. A battery-assisted passive (BAP) has a small battery on board that is activated when in the presence of a RFID reader.

A radio-frequency identification system uses tags, or labels attached to the objects to be identified. Two-way radio transmitter-receivers called readers or interrogators send a signal to the tag and read its response.

RFID tags can be passive, active, or battery-assisted passive. An active tag has an on-board battery and periodically transmits its ID signal. A battery-assisted passive (BAP) has a small battery on board and is activated when in the presence of a RFID reader. A passive tag is cheaper and smaller because it has no battery. However, to start operation of passive tags, they must be illuminated with a power level roughly three magnitudes stronger than for signal transmission. That makes a difference in interference and in exposure to radiation.

RFID tags contain at least two parts: an integrated circuit for storing and processing information, modulating and demodulating a radio-frequency (RF) signal, collecting DC power from the incident reader signal, and other specialized functions; and an antenna for receiving and transmitting the signal. The tag information is stored in a non-volatile memory. The RFID tag includes either a chip-wired logic or a programmed or programmable data processor for processing the transmission and sensor data, respectively.

A RFID reader transmits an encoded radio signal to interrogate the tag. The RFID tag receives the message and then responds with its identification and other information. This can be only a unique tag serial number, or product-related information, such as a stock number, lot or batch number, production date, or other specific information.

RFID systems can be classified by the type of tag and reader. A Passive Reader Active Tag (PRAT) system has a passive reader that only receives radio signals from active tags (battery operated, transmit only). The reception range of a PRAT system reader can be adjusted from 1-2,000 feet (0.30-610 m) to allow flexibility in applications such as asset protection and supervision.

An Active Reader Passive Tag (ARPT) system has an active reader, which transmits interrogator signals and also receives authentication replies from passive tags. An Active Reader Active Tag (ARAT) system uses active tags awoken with an interrogator signal from the active reader. A variation of this system could also use a Battery-Assisted Passive (BAP) tag that acts like a passive tag but has a small battery to power the tag's return reporting signal.

Fixed readers can be set up to create a specific interrogation zone that can be tightly controlled. This allows a highly defined reading area for when tags go in and out of the interrogation zone.

Signaling between the reader and the tag is done in several different incompatible ways, depending on the frequency band used by the tag. Tags operating on LF and HF bands are, in terms of radio wavelength, very close to the reader antenna because they are only a small percentage of a wavelength away. In this near field region, the tag is closely coupled electrically with the transmitter in the reader. The tag can modulate the field produced by the reader by changing the electrical loading the tag represents. By switching between lower and higher relative loads, the tag produces a change that the reader can detect. At UHF and higher frequencies, the tag is more than one radio wavelength away from the reader, requiring a different approach. The tag can backscatter a signal. Active tags can contain functionally separated transmitters and receivers, and the tag need not respond on a frequency related to the reader's interrogation signal.

According to one embodiment of the present disclosure, a consumer carries a payment card having a RFID tag. The payment card includes at least one RFID chip, antenna tuned to receive an RF reader signal and a passive or active power module to power the RFID chip. The RFID chip includes an RF transmitter and one or more processors and memory units configured to implement a communication module that stores information and when activated reads and sends the information to the RF transmitter to transmit an RF data signal via the antenna.

At 910, one or more algorithms can be employed to determine formulaic descriptions of the assembly of the payment card holder information including payment card billing, purchasing and payment transactions, merchant information, sale technique information, and other information (e.g., demographic and/or geographic information), using any of a variety of known mathematical techniques. These formulas, in turn, can be used to derive or generate one or more predictive payment card holder profiles using any of a variety of available trend analysis algorithms. At 910, this personalization algorithm identifies the most appropriate sales techniques for a merchant to use for a particular payment card holder.

A database or repository of sales technique information at 916 can be provided to 910 where one or more algorithms can be employed to determine formulaic descriptions of the assembly of the payment card holder information. Such sales technique information includes any and all methods and approaches that sales people use to create revenue. Illustrative sales techniques include, for example, consultative selling, hard selling, heart selling, persuasive selling, Gum selling, solution selling, price-based selling, needs-based selling, relationship selling, action selling, and the like. Other information can also be provided to 910, for example, geographic data, firmographic information, advertisement data, and the like.

The activities and characteristics attributable to the payment card holders based on the one or more predictive payment card holder profiles can be conveyed to an entity (e.g., merchant), to enable the entity to employ a sales technique consistent with a payment card holder preference. In an embodiment, a payment card holder preference score can be used at 912 for conveying to an entity a propensity of the payment card holder to prefer a certain sales technique. The payment card company can convey to the entity at 912 a behavioral propensity score based on the predictive payment card holder profiles. The score is indicative of a propensity of a potential purchaser to exhibit a certain behavior (e.g., a propensity of the payment card holder to prefer a certain sales technique), and an optimal approach selection based on the individual's model score can be determined.

In an embodiment, the entity provides feedback to the payment card company to enable the payment card company to record sales at 914 made to payment card holders and to monitor and track impact of payment card holder preference for certain sales techniques. Such information can be used at 910 where one or more algorithms can be employed to determine formulaic descriptions of the assembly of the payment card holder information. This "closed loop" system allows an entity to track sales techniques used, measure efficiency of the sales techniques used, and make any improvements for the next round of campaigns.

Where methods described above indicate certain events occurring in certain orders, the ordering of certain events can be modified. Moreover, while a process depicted as a flowchart, block diagram, or the like can describe the operations of the system in a sequential manner, it should be understood that many of the system's operations can occur concurrently or in a different order.

The terms "comprises" or "comprising" are to be interpreted as specifying the presence of the stated features, integers, steps or components, but not precluding the presence of one or more other features, integers, steps or components or groups thereof.

Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it can be based on one or more other things as well. In other words, unless expressly indicated otherwise, as used herein "based on" means "based at least in part on" or "based at least partially on."

It should be understood that the present disclosure includes various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A method for identifying a payment card holder preference for a certain sales technique, the method comprising:
   retrieving, from one or more databases, a first set of information including purchasing and payment activity information attributable to the payment card holder;
   retrieving, from the one or more databases, a second set of information including merchant information associated with the purchasing and payment activity;
   retrieving, from the one or more databases, a third set of information including sales technique information, wherein the sales technique information includes techniques selected from a group consisting of consultative selling, hard selling, heart selling, persuasive selling, Guru selling, solution selling, price-based selling, needs-based selling, relationship selling, action selling, and any combination thereof;
   identifying associations between the first set of information and the second set of information to generate a predictive payment card holder profile; and
   correlating the predictive payment card holder profile with the sales technique information to determine behavioral information of the payment card holder;
   extracting from the behavioral information an intent of the payment card holder;
   generating, based on the behavioral information and the intent information, one or more preferences for a certain sales technique to be used.

2. The method of claim 1, wherein the correlating is performed algorithmically.

3. The method of claim 1, further comprising:
   providing a payment card holder preference score that is used for conveying to an entity a propensity of the payment card holder to prefer the certain sales technique.

4. The method of claim 3, wherein said entity comprises one or more merchant entities.

5. The method of claim 1, further comprising:
   identifying activities and characteristics attributable to the payment card holder based on the predictive payment card holder profile.

6. The method of claim 5, further comprising:
conveying to an entity the activities and characteristics attributable to the payment card holder based on the predictive payment card holder profile, to enable the entity to employ the certain sales technique consistent with the payment card holder preference.

7. The method of claim 5, wherein the payment card holders is a person and/or businesses, wherein the activities attributable to the payment card holders are financial transactions, and wherein the characteristics attributable to the payment card holders are sales technique preferences, demographics and/or geographical characteristics.

8. The method of claim 1, wherein the predictive payment card holder profile is further refined based on the behavioral information of the payment card holder and the intent of the payment card holder.

9. The method of claim 1, wherein the first set of information comprises purchasing and payment transactions by the payment card holder.

10. The method of claim 1, wherein the second set of information comprises merchant name, merchant address, merchant location(s) of business, and merchant category.

11. The method of claim 1, wherein the third set of information further comprises survey data, test group data, and psychological profile data.

12. The method of claim 1, wherein the merchant information associated with the purchasing and payment activity includes categorization of merchants by industry sectors.

13. The method of claim 1, further comprising:
tracking and measuring impact of the sales technique on the payment card holder, based at least in part on purchasing and payment activities attributable to the payment card holder, after the sales technique has been employed.

14. The method of claim 1, further comprising using merchant characterization information to identify card holder preferences for sales techniques for particular merchants.

15. A system for identifying preferences for one or more payment card holders for a certain sales technique, the system comprising:
one or more databases comprising a first set of information including purchasing and payment activity information attributable to the one or more payment card holders;
one or more databases comprising a second set of information including merchant information associated with the purchasing and payment activity;
one or more databases comprising a third set of information including sales technique information, wherein the sales technique information includes techniques selected from a group consisting of consultative selling, hard selling, heart selling, persuasive selling, Guru selling, solution selling, price-based selling, needs-based selling, relationship selling, action selling, and any combination thereof;
a processor configured to:
identifying associations between the first set of information and the second set of information to generate one or more predictive payment card holder profiles; and
correlate the one or more predictive payment card holder profiles with the sales technique information to determine behavioral information of the payment card holders;
extracting from the behavioral information an intent of the one or more payment card holders;
generating, based on the behavioral information and the intent information, one or more preferences for a certain sales technique to be used.

16. The system of claim 15, wherein the correlating is performed algorithmically.

17. The system of claim 15, wherein the processor is further configured to:
provide a payment card holder preference score that is used for conveying to an entity a propensity of the one or more payment card holders to prefer the certain sales technique; and
identify activities and characteristics attributable to said one or more payment card holders based on the one or more predictive payment card holder profiles.

18. The system of claim 15, wherein the first set of information comprises purchasing and payment transactions by said one or more payment card holders, wherein the second set of information comprises merchant name, merchant address, merchant location(s) of business, and merchant category, and wherein the third set of information comprises sales technique information, survey data, test group data, and psychological profile data.

19. The system of claim 15, wherein the processor is further configured to:
track and measure impact of the sales technique on the one or more payment card holders, based at least in part on purchasing and payment activities attributable to the one or more payment card holders, after the sales technique has been employed.

20. A method for generating one or more predictive payment card holder profiles, the method comprising:
retrieving, from one or more databases, a first set of information including purchasing and payment activity information attributable to one or more payment card holders;
retrieving, from the one or more databases, a second set of information including merchant information associated with the purchasing and payment activity;
retrieving, from the one or more databases, a third set of information including sales technique information, wherein the sales technique information includes techniques selected from a group consisting of consultative selling, hard selling, heart selling, persuasive selling, Guru selling, solution selling, price-based selling, needs-based selling, relationship selling, action selling, and any combination thereof;
identifying associations amongst the first set of information, the second set of information and the third set of information to determine behavioral information of the payment card holders;
extracting information related to an intent of the payment card holders from the behavioral information; and
generating the one or more predictive payment card holder profiles based on the behavioral information and intent of the payment card holders, wherein the payment card holders having a propensity to prefer a certain sales technique based on the one or more predictive payment card holder profiles.

21. The method of claim 20, further comprising:
identifying activities and characteristics attributable to the payment card holders based on the one or more predictive payment card holder profiles and
conveying to an entity activities and characteristics attributable to the payment card holders based on the one or more predictive payment card holder profiles, to enable the entity to employ the certain sales technique consistent with a preference of the one or more predictive payment card holder profiles.

22. The method of claim 21, wherein the one or more predictive payment card holder profiles are capable of predicting behavior and intent in the payment card holders.

23. The method of claim 21, further comprising using merchant characterization information to identify card holder preferences for sales techniques for particular merchants.

* * * * *